(12) United States Patent
Armstrong et al.

(10) Patent No.: US 11,989,250 B2
(45) Date of Patent: May 21, 2024

(54) SYSTEM AND METHOD FOR SHARING MEDIA BETWEEN CLIENT DEVICES

(71) Applicant: Thank You LLC, Port Charlotte, FL (US)

(72) Inventors: Justin Armstrong, Naples, FL (US); Logan Fields, Featerville Trevose, PA (US)

(73) Assignee: Thank You LLC, Port Charlotte, FL (US)

( * ) Notice: Subject to any disclaimer, the term of this patent is extended or adjusted under 35 U.S.C. 154(b) by 0 days.

(21) Appl. No.: 17/841,261

(22) Filed: Jun. 15, 2022

(65) Prior Publication Data

US 2022/0398289 A1 Dec. 15, 2022

Related U.S. Application Data

(60) Provisional application No. 63/210,732, filed on Jun. 15, 2021.

(51) Int. Cl.
| | | |
|---|---|---|
| *G06F 15/16* | (2006.01) | |
| *G06F 16/438* | (2019.01) | |
| *G06F 16/955* | (2019.01) | |
| *G06F 21/31* | (2013.01) | |

(52) U.S. Cl.
CPC ........ *G06F 16/9566* (2019.01); *G06F 16/438* (2019.01); *G06F 16/9558* (2019.01); *G06F 21/31* (2013.01)

(58) Field of Classification Search
CPC .............. G06F 16/9566; G06F 16/438; G06F 16/9558; G06F 21/31; G06F 21/6245
See application file for complete search history.

(56) References Cited

U.S. PATENT DOCUMENTS

| | | | | |
|---|---|---|---|---|
| 2013/0311503 | A1* | 11/2013 | Boncyk | G06Q 30/0277 707/758 |
| 2014/0110468 | A1* | 4/2014 | Kandregula | G06F 16/9566 235/375 |
| 2014/0117076 | A1* | 5/2014 | Eberlein | G06F 16/9566 235/375 |
| 2016/0239733 | A1* | 8/2016 | Hertz | H04W 4/029 |
| 2018/0075156 | A1* | 3/2018 | Broselow | G06K 7/10861 |
| 2018/0190050 | A1* | 7/2018 | Pinney | G06Q 10/107 |
| 2019/0005145 | A1* | 1/2019 | Kleinberg | G06F 16/9554 |

* cited by examiner

*Primary Examiner* — Phuoc H Nguyen
(74) *Attorney, Agent, or Firm* — MCANDREWS HELD & MALLOY, LTD

(57) ABSTRACT

A method for sharing media between a first device and a second device may include: scanning a quick-response (QR) code with the first device; extracting, by the first device, a uniform resource locator (URL) encoded in the QR code; recording, by the first device, media; associating, by the first device, the URL with the media; communicating, from the first device to a server, the media and the URL; scanning, with a second device, the QR code; extracting, by the second device, the URL encoded in the QR code; communicating, from the second device to the server, the URL; receiving, by the second device, in response to communicating the URL to the server, the media from the server; and playing, by the second device, the media on at least one of a display and a speaker.

18 Claims, 3 Drawing Sheets

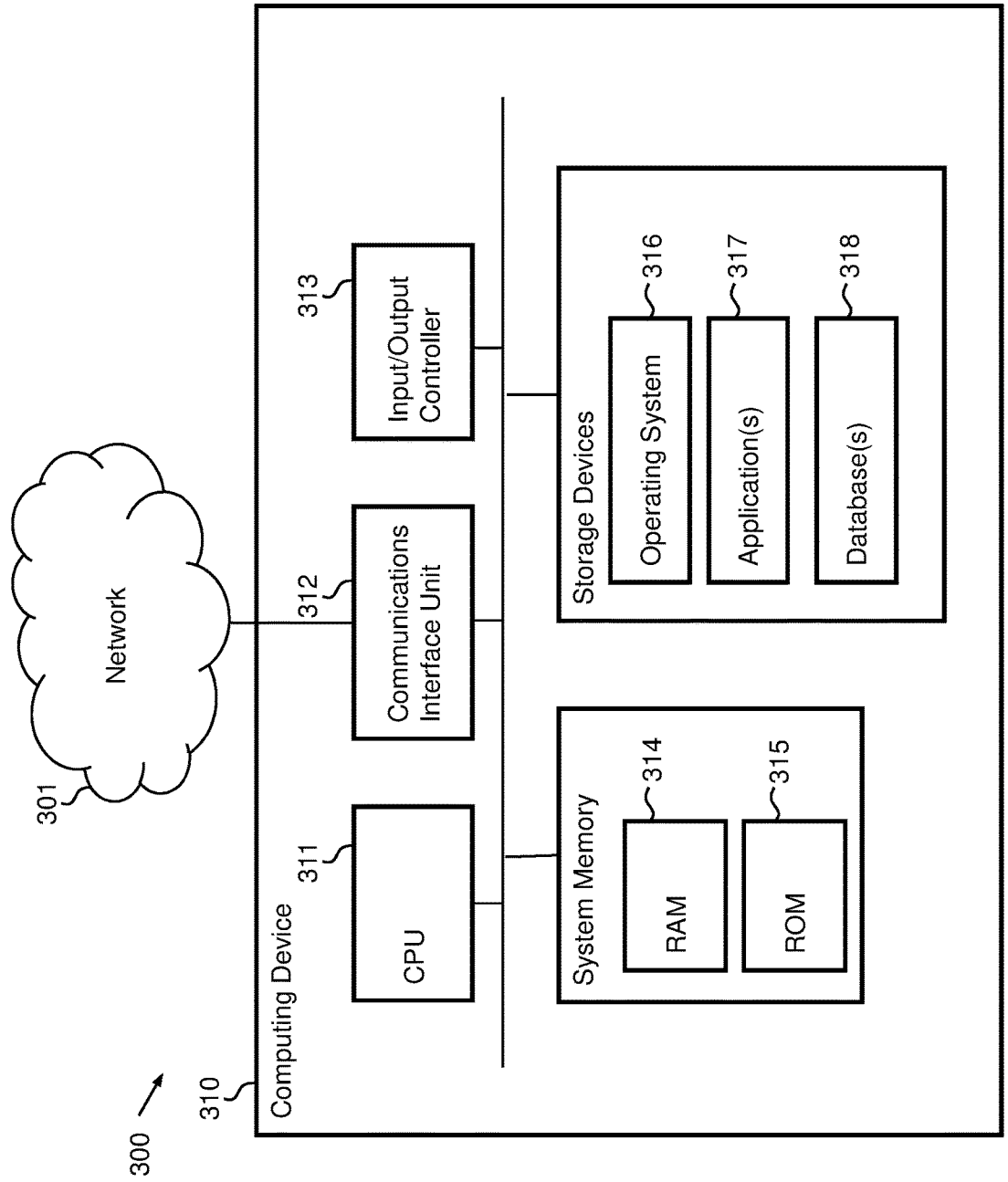

SYSTEM AND METHOD FOR SHARING MEDIA BETWEEN CLIENT DEVICES

CROSS REFERENCE TO RELATED APPLICATIONS

This application claims priority to and the benefit of U.S. Prov. 63/210,732, filed on Jun. 15, 2021, the entirety of which is herein incorporated by reference.

BACKGROUND

Generally, this application relates to providing selective access and control of websites to share media between devices.

SUMMARY

According to embodiments herein, a method for sharing media between a first device and a second device includes: scanning, with a camera of a first device, a quick-response (QR) code; extracting, by the first device, information in a uniform resource locator (URL) encoded in the QR code; recording, by the first device, media, wherein the media includes at least one of audio through a microphone or video through a camera; associating, by the first device, information in the URL with the media; communicating, from the first device to a server, the media and the information in the URL; scanning, with a camera of a second device, the QR code; extracting, by the second device, the information in the URL encoded in the QR code; communicating, from the second device to the server, the information in the URL; receiving, by the second device, in response to communicating the information in the URL to the server, the media from the server; and playing, by the second device, the media on at least one of a display and a speaker. The method may further include: receiving, by the first device, credentials corresponding to a user; associating the credentials with information included in the information in the URL and media; and communicating from the first device to the server, the credentials. Only one credentials may be associated with the information included in the information in the URL. Said receiving the credentials may include receiving the credentials through an app executing on the first device. The app may comprise a browser presenting a web application from the server. The app may not comprise a browser. The method may further include storing, by the server, a record in a database, wherein the record includes the credentials and information corresponding to the QR code. The credentials may include a user name and a password. The method may further include associating the credentials with a plurality of information in a corresponding plurality of URLs corresponding to a plurality of QR codes. The method may further include receiving, by the second device, at least a portion of the credentials when receiving the media. The at least a portion of the credentials may include a user name. Said communicating, from the first device to the server, the media may include communicating a media file including the media. Said receiving, by the second device, the media from the server may include receiving a media file including the media. Said receiving, by the second device, the media from the server may include receiving a stream including at least a portion of the media. The QR code may encode a unique URL.

According to embodiments, a system configured to communicate on a network with a first device and a second device includes: a communications interface configured to transmit and receive communications with the first device and the second device; and a webserver, wherein the system is configured to: receive information corresponding to a QR code and media from the first device; store the media in association with the information corresponding to the QR code; receive the information corresponding to the QR code from the second device; and responsively transmit, by the webserver, the media to the second device. The system may include a records management component including a database, wherein the system is configured to receive credentials from the first device, and store a record of the information corresponding to the QR code together with the credentials in the database. The system may be configured to store only one credentials together with the information corresponding to the QR code. The webserver may be configured to transmit the media to the second device by streaming the media. The system may be configured to execute a web application on the first device to receive the media and the information corresponding to the QR code.

BRIEF DESCRIPTION OF SEVERAL VIEWS OF THE DRAWINGS

FIG. 3 shows a computing device, according to certain embodiments.

Figure 1:
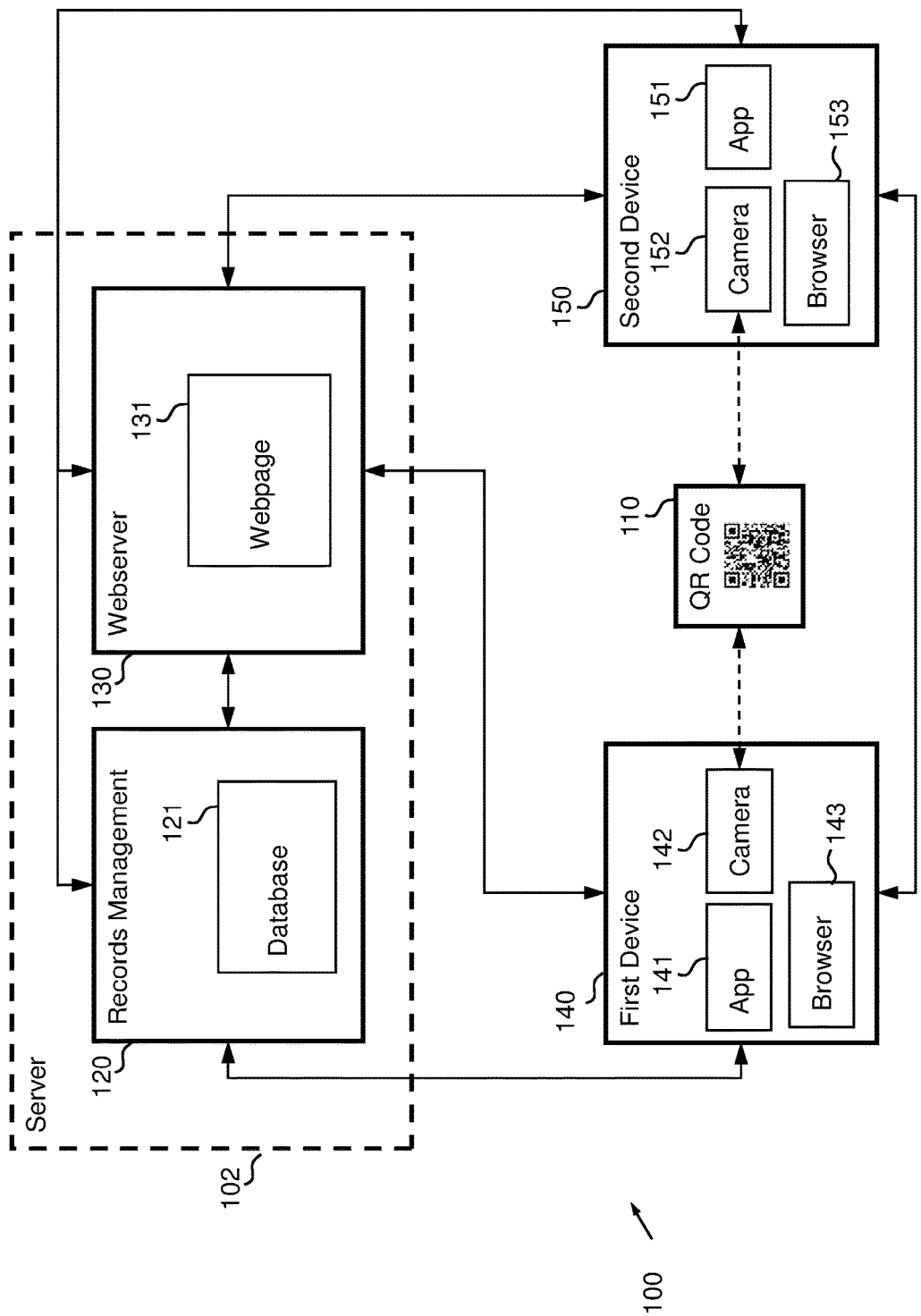
FIG. 1 illustrates a media sharing system, according to certain embodiments.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION

FIG. 1 illustrates a media sharing system 100, according to certain embodiments. System 100 may include QR code 110, server 102, records management component 120, webserver 130, first device 140, and second device 150. Records management component 120, webserver 130, first device 140, and second device 150 may communicate with one or more of each other via a network, such as the Internet or private network segments. The double-headed arrow solid lines indicate possible or theoretical network communications between components of system 100. Not all indicated networking need be implemented. Server 102, records management component 120, webserver 130, first device 140, and second device 150 may be examples of computing devices 300, as described with respect to FIG. 3.

QR code 110 (or more formally, "quick response" code) may encode a URL. The URL may include various data, such as domain name, top-level domain, geographical domain, port, file path, query, query parameters, fragment, and/or the like. The entire URL, or portions thereof, may be considered information in the URL. The URL encoded in QR code 110 shown in FIG. 1 is random and has no particular relevance, and is not necessarily reflective of all aspects of URLs as described in all embodiments herein. QR code 110 may be printed (e.g., on a greeting card, label, slip of paper, or the like). QR code 110 may be shared electronically, as well (e.g., in an email, text message, or the like).

Records management component 120 may be an enterprise server or backend server that communicates via the Internet and/or other networks, such as a private LAN. Records management component 120 may be a combination of networked servers, or may be combined with webserver 130, for example, in server 102. Records management component 120 may include database 121. Records management component 120 may communicate with one or more of webserver 130, first device 140, or second device 150, for example, via a communications interface.

Webserver 130 may be a web server that communicates via the Internet and/or other networks, such as a private LAN. Webserver 130 may be a combination of networked servers, or may be combined with records management component 120, for example, in server 102. Webserver 130 may host one or more websites and serve one or more webpages 131, which will be further described. Webserver 130 may communicate with one or more of records management component 120, first device 140, or second device 150, for example, via a communications interface.

First device 140 may be a mobile device, such as a smart phone or tablet. First device 140 may be a laptop or desktop computer. First device may include camera 142 and may execute applications, such as app 141 and browser 143. First device 140 may be able to scan QR code 110 via camera 142. First device 140 may further be able to process information encoded on QR code 110 via applications, such as app 141 and browser 143. Browser 143 (e.g., one involved with a web application being executed at least partially on server 102) may be considered an app (e.g., app 141), while app 141 may be considered a non-browser app. When browser 143 is involved with a web application, the web application may be executed solely on server 102 or at a combination of server 102 and first device 140. App 141 may optionally include browser 143, in which case app 141 would include functionality other than that provided by browser 143. Examples of apps that include browser functionality include Twitter® and Facebook®. First device 140 may further include a microphone (not shown) and speaker (not shown). The microphone may record external sounds (e.g., a user's voice), and the speaker may play sounds to a user. First device 140 may record video via camera 142, still images via camera 142, live images via camera 142, and/or audio via microphone. Video, still images, live images, and/or audio are examples of media. First device may store recorded media as a media file (e.g., MPEG, JPEG, GIF, MP3, or the like). First device 140 may communicate with one or more of records management component 120, webserver 130, or second device 150.

Second device 150 may be a mobile device, such as a smart phone or tablet. Second device 150 may be a laptop or desktop computer. Second device 150 may be similar to first device 140. Second device 150 may include camera 152 and may execute applications, such as app 151 and browser 153. App 151 may be similar to app 141. Browser 153 may be similar to browser 143. Camera 152 may be similar to camera 142. Second device 150 may be able to scan QR code 110 via camera 152. Second device 150 may further be able to process data encoded on QR code 110 via applications, such as app 151 and browser 153. Second device 150 may further include a microphone (not shown) and speaker (not shown). The microphone may record external sounds (e.g., a user's voice), and the speaker may play sounds to a user. Second device 150 may be able to record media and generate media files as with first device 140. Second device 150 may communicate with one or more of records management component 120, webserver 130, or first device 140. Second device 150 may be similar to first device 140, including hardware (e.g., camera, microphone, or speaker) and software (e.g., app and browser). More devices are possible but not shown, such as third device, fourth device, etc. Such additional devices may be similar to second device 150, both structurally and functionally.

Figure 2:
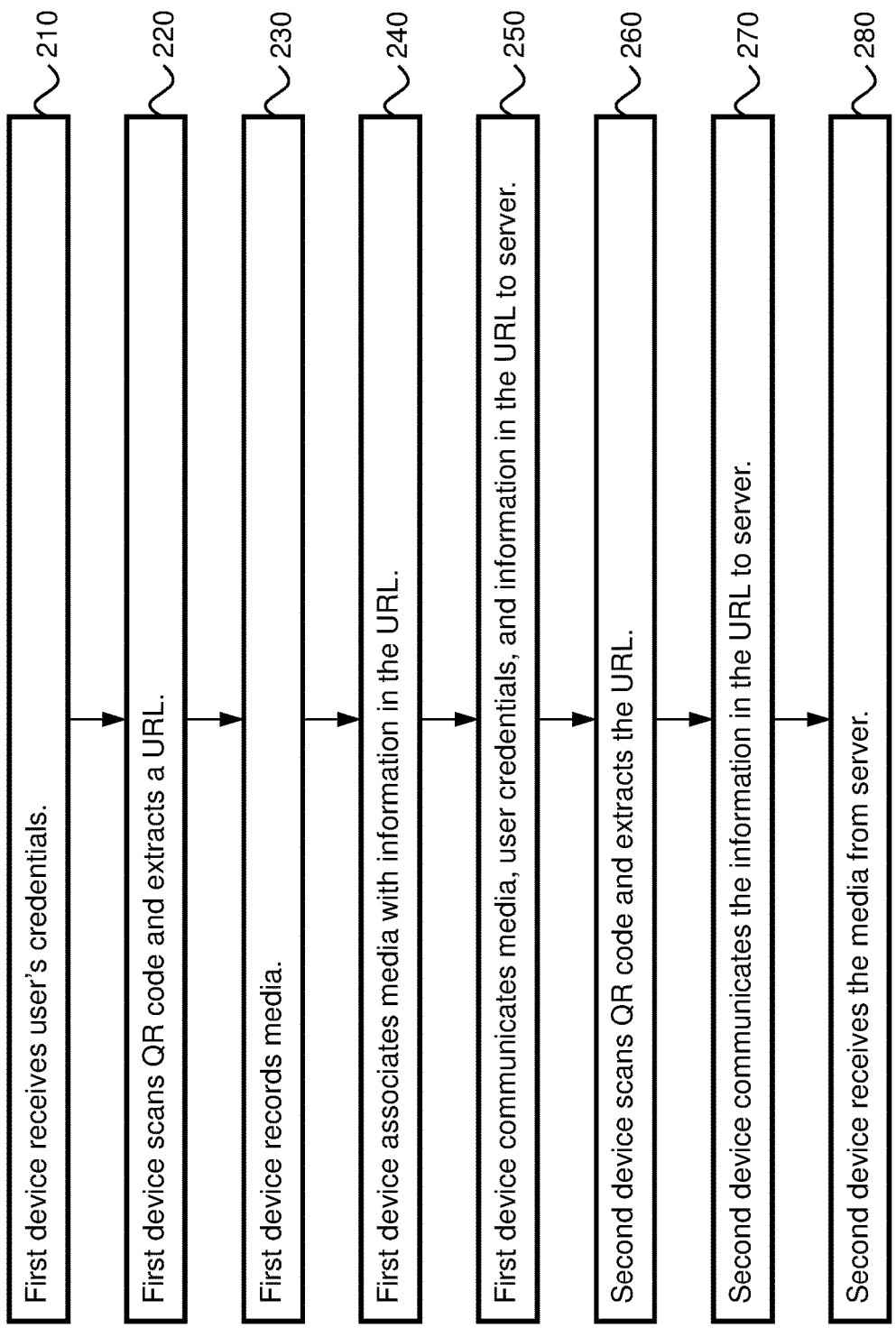
FIG. 2 shows a flow chart for sharing media, according to certain embodiments.

FIG. 2 shows a flow chart 200 for sharing media between first device 140 and second device 150, according to certain embodiments. Steps of the method may be performed by one or more computing devices, such as computing device 300. For example, the method may be performed by first device 140 and second device 150, each of which may be a computing device 300. The method may also be performed by server 102, records management component 120, and/or webserver 130, each of which may be a computing device 300. Steps of the method may be performed simultaneously and/or in a different order, unless specified otherwise. The method may be performed by computing device(s) 300 executing software instructions, as described, for example, herein. For example, the method may be performed by first device executing app 141 and/or browser 143 (e.g., browser involved in the execution of a web application at least partially on server 102), and second device executing app 151 and/or browser 153 (e.g., browser involved in the execution of a web application at least partially on server 102). As a browser involved in the execution of a web application may be considered an app, references below are only to app 141, 151, unless specified otherwise.

At step 210, first device 140 may receive a user's credentials. For example, first device 140 may receive user's credentials through app 141. Such credentials may include one or more of user name, password, displayed name, address, age, avatar, and/or the like. For example, a user may register an account or sign in to an existing account, each of which may involve entering credentials into first device 140. In the case of a user registering an account, such account information may be communicated to and stored in server 102. Step 210 may be performed during or after steps 220, 230, or 240.

At step 220, first device 140 scans a QR code 110 and extracts a URL. Step 220 may be performed before step 210 or after steps 230 or 240. At step 220, first device 140 may scan QR code 110 via camera 142. Before (or after) scanning QR code 110, app 141 may be launched such that it is executing when QR code 110 is scanned. App 141 may prompt the first user to scan QR code 110. Once QR code 110 is scanned via camera 142, first device 140 may decode the image to extract the URL. The URL may be unique.

A QR code 110 might only be permitted to be used (or "claimed") one time to associate media. If QR code 110 has already been claimed before scanning, app 141 may inform the first user that QR code 110 cannot be claimed again. App 141 may request the first user to scan a different QR code 110. If QR code 110 has not been claimed, then the method may proceed.

According to another technique, scanning QR code 110 may cause first device 140 to prompt the first user via a graphical user interface (GUI) (e.g., a notification) to optionally launch app 141. When the first user responsively interacts with the GUI, app 141 may be automatically launched. In the case that browser 143 is launched (whether included in app 141 or not), browser 143 may navigate to a website associated with the URL, which may include an address associated with server 102. When server 102 receives the communication from first device 140, server 102 may begin execution of a web application involving first device 140 to present information to the first user. If app 141 has already been launched and/or is being presented to the first user of first device 140, browser 143 may not automatically navigate to the website associated with the URL.

At step 230, first device 140 may record media (e.g., video, still images, audio, and/or the like) via camera 142 and/or microphone. Media may be recorded through other sensors, such as sensors wirelessly connected to first device 140 (e.g., Bluetooth microphones or cameras) or sensors physically connected to first device 140 (e.g., devices connected to ports, such as USB, Lighting Port, and/or the like). First device 140 may save media as a media file. Step 230 may be performed before steps 210 or 220. Media may be pre-recorded, either by first device 140 or otherwise. For example, media may be stored as one or more media files (hereinafter, media file, singular) on first device 140 or at a location accessible to first device 140 (e.g., cloud or networked storage). App 141 may be able to access the media file.

At step 240, first device 140 may associate media with information in the URL. For example, app 141 and/or browser 143 may associate media with information in the URL. First device 140 may associate media with information in the URL wholly within first device 140, or may make the association via a process with an external device, such as webserver 130. For example, webserver 130 may execute or cause to be executed on app 141 or browser 143 a web application. The web application may prompt the first user of first device 140 to enter information and/or interact with a GUI on the app 141 and/or browser 143. As that information is provided by the first user, it may be transmitted to webserver 130. In such a case, the transmission of different information from first device 140 to webserver 130 may be considered a type of association of such different information. The first user's credentials (or a subset thereof) may also be associated with the information in the URL and/or media. Once the first user's credentials are associated with the information in the URL, the URL may be "claimed." After being claimed, it may no longer be possible for another to claim the URL and/or associate different media with the information in the URL.

At step 250, first device 140 may communicate the media with information in the URL to server 102 (e.g., records management component 120 and/or webserver 130). The media may be communicated (e.g., uploaded) in a media file, portions of a media file, and/or by streaming. First device 140 may communicate the media across the network to the URL extracted from QR code 110. First device 140 may also communicate the first user's credentials to server (e.g., records management component 120) before, during, or after step 250. The credentials may be communicated with information in the URL. For example, first device 140 may communicate the credentials across the network to the URL extracted from QR code 110.

At step 260, second device 150 scans QR code 110 and extracts the URL. Second device 150 may already be executing app 151 or browser 153 before QR code 110 is scanned, or not. For example, scanning QR code 110 may cause second device 150 to inquire with the second user whether the second user wishes to have browser 153 navigate to the URL encoded in QR code 110. If the second user agrees (or in response to another process), at step 270, second device 150 may communicate information in the URL (e.g., the URL entirely, or portions thereof) to server 102.

At step 270, second device 150 communicates information in the URL to server 102. For example, browser 153 may navigate to the URL, which specifies a webpage 131 at server 102. At step 280, second device 150 receives the media uploaded from first device 140 at step 250. The media may be streamed or sent as a file from server 102 to second device 150. Prior to receiving the media, the server 102 may redirect the navigation such that a different URL is associated with the download process from server 102 to second device 150. The media may then be played by second device 150 to the second user—e.g., play the media on one of a display or speaker of second device 150, depending on the type of media. Second device 150 may also receive at least a portion of the first user's credentials when receiving the media—e.g., the name or avatar of the first user. If the URL has not been claimed, server 102 may respond (e.g., via webserver 130) that the specified webpage 131 is not accessible. The webpage 131 may not exist until the URL has been claimed and/or associated media has been uploaded. Further, webpage 131 may be identified by a URL directly associated to the URL encoded in QR code 110, according to a redirect algorithm. Both the URL encoded in QR code 110 and the redirect URL may be maintained in a given record in database 121.

The system may operate in the following exemplary context and procedure for communicating media between a first user ("Jack") and a second user ("Jill"). A batch of QR codes, including QR code 110, are printed. Each QR code is unique in that it encodes a unique URL— i.e., no two QR codes are identical. The QR codes are printed on greeting cards. A corresponding set of database records are created in database 121—one record for each QR code. Each of these created records in database 121 includes information that can be correlated to the corresponding unique URL in a given QR code.

The first user purchases a greeting card. The greeting card is for the second user's $53^{rd}$ birthday. The first user wishes to transmit a video message of the first user and her family wishing the second user a happy $53^{rd}$ birthday in association with the greeting card. As further described, the first user will scan QR code 110, record the video message, and send the greeting card including QR code 110 to the second user. The second user can then scan QR code 110 to play the video message on second device 150.

There may be two ways for the first user to initiate the process of associating the video including the video message with QR code 110. One way is through app 141 executing at least primarily on first device 140. The second way is through browser 143 executing a web application at least partially on server 102. If using app 141, the first user may launch app 141 on first device 140 before scanning QR code 110. If using browser 143, the first user may first scan QR code 110, which may cause browser 143 to be launched (e.g., first device 140 may extract the URL encoded in QR code 110 and prompt the first user via a notification whether the first user would like the browser to navigate to the URL). For this example, it is assumed the first user is proceeding using app 141, although the process described herein may be equally as applicable, in relevant part, when using browser 143 involved in the presentation of a web application executing at least partially on server 102.

The first user launches app 141 on first device 140. App 141 then gives the first user the option to sign in or create an account. In this example, the first user chooses to create a new account. App 141 prompts the first user for user name, password, name to be publicly presented, and optional information including age, sex, given name, email address, mailing address, payment information, and/or the like. The first user provides a user name, password, and name to be publicly presented ("Jack"). This information is sent to records management component 120 of server 102. Records management component 120 then creates an account for the first user, which includes the user name, password, and name to be presented (Jack). Records management component 120 also stores account information for multiple users.

Next, app 141 asks the first user for permission to use camera 142. The first user agrees, and app 141 then prompts the first user to scan QR code 110. The first user points camera 142 at QR code 110, and first device 140 automatically recognizes and decodes QR code 110. Decoding results in a unique URL. The URL specifies the domain of server 102. App 141 then navigates to the URL on server 102, and server 102 then determines whether the URL has already been claimed (either by the first user or by another user). In this case, the URL has not been claimed, so the process can continue. In some embodiments, it may be possible for the process to continue if the first user has previously claimed the URL—e.g., the first user may be able to associate new media with QR code 110. But for this example, the URL has never been claimed. Server 102 then populates the appropriate record in database 121 with the first user's identity such that the first user is now "permanently" associated with the unique URL encoded in QR code 110.

App 141 then prompts the first user to either select a pre-recorded video or record a new one with camera 142. The first user chooses to record a new video. App 141 then prompts the first user to begin recording, and the first user interacts with app 141 to begin recording. The first user then, using camera 142, records himself and his smiling family saying: "Happy 53$^{rd}$ birthday, Jill!" The video is saved as a video file on first device 140. App 141 then asks the first user if the first user would like to review the video, which the first user agrees to. The first user is satisfied with the video and instructs app 141 to proceed with the process. App 141 then causes the video file to be uploaded to server 102. The appropriate database record is updated in database 121 to indicate that there is now associated media with the URL. The video file is stored on webserver 130 in association with the unique URL that specifies webpage 131. The first user is given the option by app 141 to repeat this process for other QR codes (e.g., on other greeting cards), but chooses not to at this time.

The first user then sends the greeting card with QR code 110 to the second user through the mail. The second user receives the greeting card, which indicates that there is a video that can be retrieved by scanning QR code 110.

The second user positions camera 152 of second device 150 such that QR code 110 can be scanned. Second device 150 then automatically scans QR code 110 and extracts the unique URL. Second device 150 then asks the second user if browser 153 should navigate to the URL. The second user agrees and browser 153 automatically navigates to the URL, at which time second device 150 communicates the URL to server 102. Server 102 checks database 121 and sees that there is associated media. That media is then streamed to second device 150 and the second user watches the video message. In this way, the first user shares a video in association with a greeting card sent to the second user.

The second user may also have app 151 installed on second device 150. Thereby, second device 150 may communicate with first device 140 and/or server 102 as does first device 140. The second user may send a message to the first user on first device 140 using app 151. The second user may also send media to the first user via app 151.

FIG. 3 is a block diagram of a computing device, such as any of the components of the system 100 implemented in FIG. 1, for performing any of the processes described herein, according to an illustrative embodiment. Each of the components may be implemented on one or more computing devices 300 communicating over a network 310. In certain aspects, a plurality of the components of these systems may be included within one computing device 300. In certain implementations, a component and a storage device may be implemented across several computing devices 300.

The computing device 300 includes at least one communications interface unit 302, an input/output controller 303, system memory, and one or more data storage devices. The system memory includes at least one random access memory (RAM 304) and at least one read-only memory (ROM 305). All of these elements are in communication with a central processing unit (CPU 301) to facilitate the operation of the computing device 300. The computing device 300 may be configured in many different ways. For example, the computing device 300 may be a conventional standalone computer or alternatively, the functions of the computing device 300 may be distributed across multiple computer systems and architectures. Alternatively, a computer system may be virtualized to provide the functions of multiple computing devices 300. In FIG. 3, the computing device 300 is linked, via network 310 (e.g., the Internet, LAN, WAN, etc.) to other computing devices or systems.

The computing device 300 may be configured in a distributed architecture, wherein databases and processors are housed in separate units or locations. Some units perform primary processing functions and contain, at a minimum, a general controller or a processor and a system memory. In distributed architecture implementations, each of these units may be attached via the communications interface unit 302 to a communications hub or port (not shown) that serves as a primary communication link with other computing devices, servers, client or user computers and other related devices. The communications hub or port may have minimal processing capability itself, serving primarily as a communications router. A variety of communications protocols may be part of the system.

The CPU 301 includes a processor, such as one or more conventional microprocessors and one or more supplementary co-processors such as math co-processors for offloading workload from the CPU 301. The CPU 301 is in communication with the communications interface unit 302 and the input/output controller 303, through which the CPU 301 communicates with other devices such as other servers, user terminals, or devices. The communications interface unit 302 and the input/output controller 303 may include multiple communication channels for simultaneous communication with, for example, other processors, servers or client terminals.

The CPU 301 is also in communication with the data storage device. The data storage device may include an appropriate combination of magnetic, optical or semiconductor memory, and may include, for example, RAM, ROM, flash drive, an optical disc such as a compact disc or a hard disk or drive. The CPU 301 and the data storage device each may be, for example, located entirely within a single computer or other computing device, or connected to each other by a communication medium, such as a USB port, serial port cable, a coaxial cable, an Ethernet cable, a telephone line, a radio frequency transceiver or other similar wireless or wired medium or combination of the foregoing. For example, the CPU 301 may be connected to the data storage device via the communications interface unit 302. The CPU 301 may be configured to perform one or more particular processing functions.

The data storage device may store, for example, (i) an operating system 306 for the computing device 300; (ii) one or more applications 307 (e.g., computer program code or a computer program product, such as an app) adapted to direct the CPU 301 in accordance with the systems and methods described here, and particularly in accordance with the processes described in detail with regard to the CPU 301; or (iii) database(s) 308 adapted to store information that may be utilized to store information required by the program.

The operating system 306 and applications 307 may be stored, for example, in a compressed, an uncompiled, and an encrypted format, and may include computer program code. The instructions of the program may be read into a main memory of the processor from a computer-readable medium other than the data storage device, such as from the ROM 305 or from the RAM 304. While the execution of sequences of instructions in the program causes the CPU 301 to perform the process steps described herein, hard-wired circuitry may be used in place of, or in combination with, software instructions for implementation of the processes of the present invention. Thus, the systems and methods described are not limited to any specific combination of hardware and software.

Suitable computer program code may be provided for performing one or more functions in relation to performing the processes as described herein. The program also may include program elements such as an operating system 306, a database management system and "device drivers" that allow the processor to interface with computer peripheral devices (e.g., a video display, a keyboard, a computer mouse, etc.) via the input/output controller 303.

The term "computer-readable medium" as used herein refers to any non-transitory medium that provides or participates in providing instructions to the processor of the computing device 300 (or any other processor of a device described herein) for execution. Such a medium may take many forms, including, but not limited to, non-volatile media and volatile media. Nonvolatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer-readable media may be involved in carrying one or more sequences of one or more instructions to the CPU 301 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 300 (e.g., a server) can receive the data on the respective communications line and place the data on a system bus for the processor. The system bus carries the data to the main memory, from which the processor retrieves and executes the instructions. The instructions received by the main memory may optionally be stored in memory either before or after execution by the processor. In addition, instructions may be received via a communication port as electrical, electromagnetic, or optical signals, which are exemplary forms of wireless communications or data streams that carry various types of information.

It will be apparent that aspects of the systems and methods described herein may be implemented in many different forms of software, firmware, and hardware in the implementations illustrated in the drawings. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication networks can include, but are not limited to, for example, any one or more of the following network topologies, including a bus network, a star network, a ring network, a mesh network, a star-bus network, tree or hierarchical network, or the like. The communications modules can be, for example, modems or Ethernet cards.

As discussed above, a computing system can include clients and servers. A client and server are generally remote from each other and typically interact through a communication network 310. The relationship of client and server arises by virtue of computer programs running on the respective computers and having a client-server relationship to each other. Computing system can be, for example, and without limitation, an enterprise server or group of servers, one or more desktop computers, one or more laptop computers, etc. Computing system can also be embedded in another device, for example, and without limitation, a mobile telephone, a personal digital assistant (PDA), a mobile audio player, a Global Positioning System (GPS) receiver, a video game console, and/or a television set top box It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A method for sharing media between a first device and a second device, the method comprising:
   receiving, by the first device, credentials corresponding to a user;
   communicating from the first device to a server, the credentials;
   scanning, with a camera of the first device on which the user's credentials have been received, a quick-response (QR) code;
   extracting, by the first device, a uniform resource locator (URL) encoded in the QR code;
   associating the URL with the user to claim the URL, such that no other user can be subsequently associated with the URL;
   recording, by the first device, media, wherein the media includes at least one of audio through a microphone or video through a camera;
   associating, by the first device, information in the URL with the media, such that no other media can be subsequently associated with the URL;
   associating the credentials with the information included in the URL and the media; and
   communicating, from the first device to a server, the media and the information in the URL;
   scanning, with a camera of a second device, the QR code;
   extracting, by the second device, the information in the URL encoded in the QR code;
   communicating, from the second device to the server, the information in the URL;
   receiving, by the second device, in response to communicating the information in the URL to the server, the media from the server; and
   playing, by the second device, the media on at least one of a display and a speaker.

2. The method of claim 1, wherein only one credentials is associated with the information in the URL.

3. The method of claim 1, wherein said receiving the credentials comprises receiving the credentials through an app executing on the first device.

4. The method of claim 3, wherein the app comprises a browser presenting a web application from the server.

5. The method of claim 3, wherein the app does not comprise a browser.

6. The method of claim 1, further comprising, storing, by the server, a record in a database, wherein the record includes the credentials and information corresponding to the QR code.

7. The method of claim 1, wherein the credentials comprises a user name and a password.

8. The method of claim 1, further comprising associating the credentials with a plurality of information in a corresponding plurality of URLs corresponding to a plurality of QR codes.

9. The method of claim 1, further comprising receiving, by the second device, at least a portion of the credentials when receiving the media.

10. The method of claim 9, wherein the at least a portion of the credentials comprises a user name.

11. The method of claim 1, wherein said communicating, from the first device to the server, the media comprises communicating a media file including the media.

12. The method of claim 1, wherein said receiving, by the second device, the media from the server comprises receiving a media file including the media.

13. The method of claim 1, wherein said receiving, by the second device, the media from the server comprises receiving a stream including at least a portion of the media.

14. The method of claim 1, wherein the QR code encodes a unique URL.

15. A system configured to communicate on a network with a first device and a second device, wherein the system comprises:
   a communications interface configured to transmit and receive communications with the first device and the second device; and
   a webserver,
   a records management component including a database, wherein the system is configured to receive credentials from the first device, and store a record of the information corresponding to the QR code together with the credentials in the database;
   wherein the system is configured to:
   receive information corresponding to a QR code and media from the first device; store the media in association with the information corresponding to the QR code, such that other media cannot be subsequently associated with the information corresponding to the QR code;
   associating the information corresponding to the QR code with a user, such that another user cannot be subsequently associated with the information corresponding to the QR code;
   receive the information corresponding to the QR code from the second device;
   responsively transmit, by the webserver, the media to the second device.

16. The system of claim 15, wherein the system is configured to store only one credentials together with the information corresponding to the QR code.

17. The system of claim 15, wherein the webserver is configured to transmit the media to the second device by streaming the media.

18. The system of claim 15, wherein the system is configured to execute a web application on the first device to receive the media and the information corresponding to the QR code.

* * * * *